United States Patent [19]

Jardin

[11] Patent Number: 4,469,371
[45] Date of Patent: Sep. 4, 1984

[54] BEARING DEVICE FOR A LENGTHWISE-DISPLACEABLE AND PIVOTABLE TELESCOPING TUBE

[75] Inventor: Hans Jardin, Inning, Fed. Rep. of Germany

[73] Assignee: Webasto-Werk W. Baier GmbH & Co., Gauting, Fed. Rep. of Germany

[21] Appl. No.: 452,291

[22] Filed: Dec. 22, 1982

[30] Foreign Application Priority Data

Jan. 27, 1982 [DE] Fed. Rep. of Germany ....... 3202507

[51] Int. Cl.³ .............................................. B60J 7/00
[52] U.S. Cl. .................................... 296/223; 296/221; 308/3.6
[58] Field of Search ........................ 296/222, 223, 221; 308/184 R, 3.6; 248/DIG. 5

[56] References Cited

U.S. PATENT DOCUMENTS

| 2,643,046 | 6/1953 | Humphreys | 248/DIG. 5 |
| 4,056,274 | 11/1977 | Jardin et al. | 296/223 |

FOREIGN PATENT DOCUMENTS

| 1228950 | 5/1967 | Fed. Rep. of Germany | 296/223 |
| 2836978 | 3/1980 | Fed. Rep. of Germany | 296/223 |
| 2008697 | 1/1970 | France | 296/221 |
| 923270 | 4/1963 | United Kingdom | 296/223 |

*Primary Examiner*—Richard A. Bertsch
*Attorney, Agent, or Firm*—Sixbey, Friedman & Leedom

[57] ABSTRACT

Bearing device for a telescoping tube of a sliding roof for vehicles, especially motor vehicles, said tube being displaceble lengthwise and being pivotable about a pivot axis running transversely to its lengthwise axis. The bearing device is provided with a guide traversed by the telescoping tube, said guide being fastened to a bearing member. The bearing member comprises a support for the guide which permits the pivoting of the guide by spring action.

20 Claims, 9 Drawing Figures

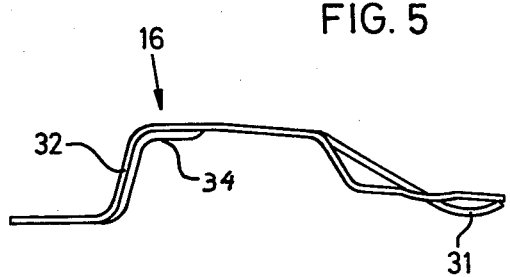
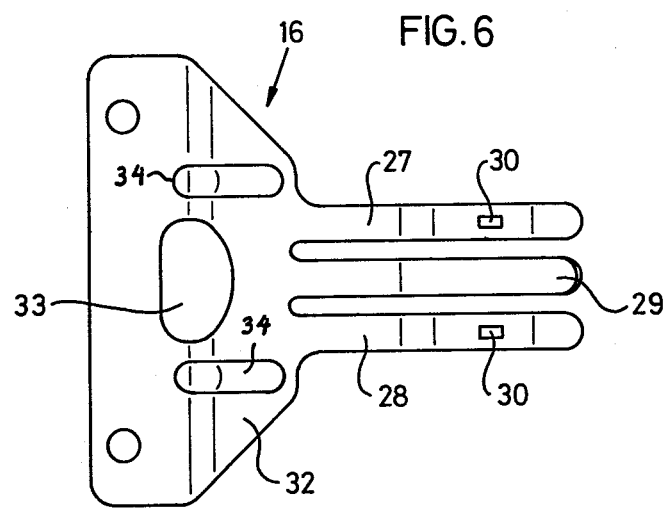

FIG. 7
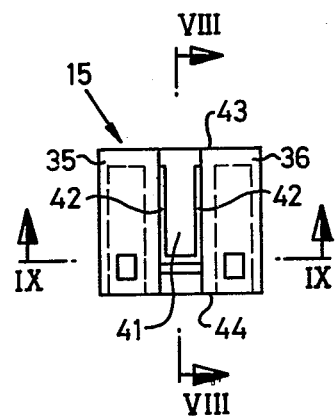
FIG. 8
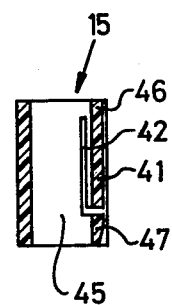
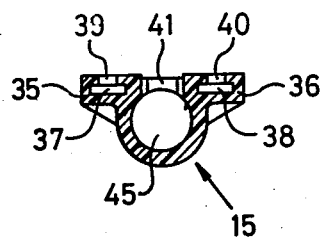
FIG. 9

BEARING DEVICE FOR A LENGTHWISE-DISPLACEABLE AND PIVOTABLE TELESCOPING TUBE

BACKGROUND AND SUMMARY OF THE INVENTION

The invention relates to a bearing device for a lengthwise-displaceable telescoping tube of a sliding roof for vehicles, especially motor vehicles, said tube being pivotable about a pivot axis running diagonally to the lengthwise axis, with a guide traversed by the telescoping tube and fastened to a bearing block.

In a known bearing device of this type (German OS No. 28 36 978), the guide is made rubber-elastic. It is elastically deflectable in the thrust direction of the rod and/or twistable at an angle thereto about the pivot axis, so that a rubber-elastic thrust bearing is produced in the thrust direction and/or a torsion bearing is produced in the pivot direction. The mutual connection between the guide and a bearing part is produced by vulcanizing, glueing, or the like. By comparison with other known bearing devices, wherein the guide is mounted in a bearing part by hinge pins, this design is intended to avoid bearing play and the rattling noise that occur at the bearing points. However, the mutual connection between the bearing part and the rubber-elastic guide is especially problematical. Manufacture is relatively expensive.

Thus, a principal object of the present invention is to provide a bearing device of the type recited hereinabove, which is especially simple and inexpensive to manufacture, which is characterized by high operating safety, but which is, at the same time, free of bearing play and rattling noises.

This object is achieved according to a preferred embodiment of the invention by virtue of the fact that, instead of the known bearing part, a bearing member is used which comprises a bearing part for the guide that permits a pivoting movement of the guide by spring action. The design according to the present invention makes a critical, relatively highly stressed, vulcanized or glued bond between the guide and the bearing block unnecessary. The guide also need not form a rubber-elastic thrust bearing or torsion bearing itself; rather, the rotary movement of the guide is accepted by a spring-loaded supporting part of the bearing member.

Preferably, at least one spring tongue is provided as the supporting part, to which torque the guide is fastened by pushing or clipping.

In order to eliminate annoying rattling at the point of contact between the guide and the telescoping tube, the bearing member, in accordance with another aspect of the invention, is provided with at least one spring-loaded pressing part for pressing a portion of the wall of the bore in the guide, which surrounds the telescoping tube, against the circumferential wall of the telescoping tube. The bearing member can advantageously be provided with three spring-loaded tongues pretensioned against one another and extending essentially in the direction of the lengthwise axis of the telescoping tube, with the two outer tongues forming the supporting part and the middle tongue, the pressing part. In such a case, the guide is advantageously equipped with two lateral projections to receive the free ends of the spring tongues that form the support, and the guide is slotted in the area between these projections, in order to produce at least one spring-loaded nose to cooperate with the pressing part. The slots which delimit the nose advantageously terminate in front of the end edges of the guide. This ensures that the telescoping tube will be surrounded by a continuous wall in the area of the two guide ends. This ensures sturdy guidance.

The guide can also be made of plastic, in particular, which has noise-reducing material properties, while the bearing member is advantageously made of sheet steel.

These and further objects, features and advantages of the present invention will become more obvious from the following description when taken in connection with the accompanying drawings which show, for purposes of illustration only, a single embodiment in accordance with the present invention.

BRIEF DESCRIPTION OF THE DRAWINGS

FIG. 5 is a side view of the bearing member on an enlarged scale;

FIG. 6 is a top view of the bearing member in FIG. 5;

FIG. 7 shows a top view of the guide on an enlarged scale;

FIG. 8 is a section along line VIII—VIII in FIG. 7; and

FIG. 9 is a section along line IX—IX in FIG. 7.

DETAILED DESCRIPTION OF THE PREFERRED EMBODIMENT

Figure 1:
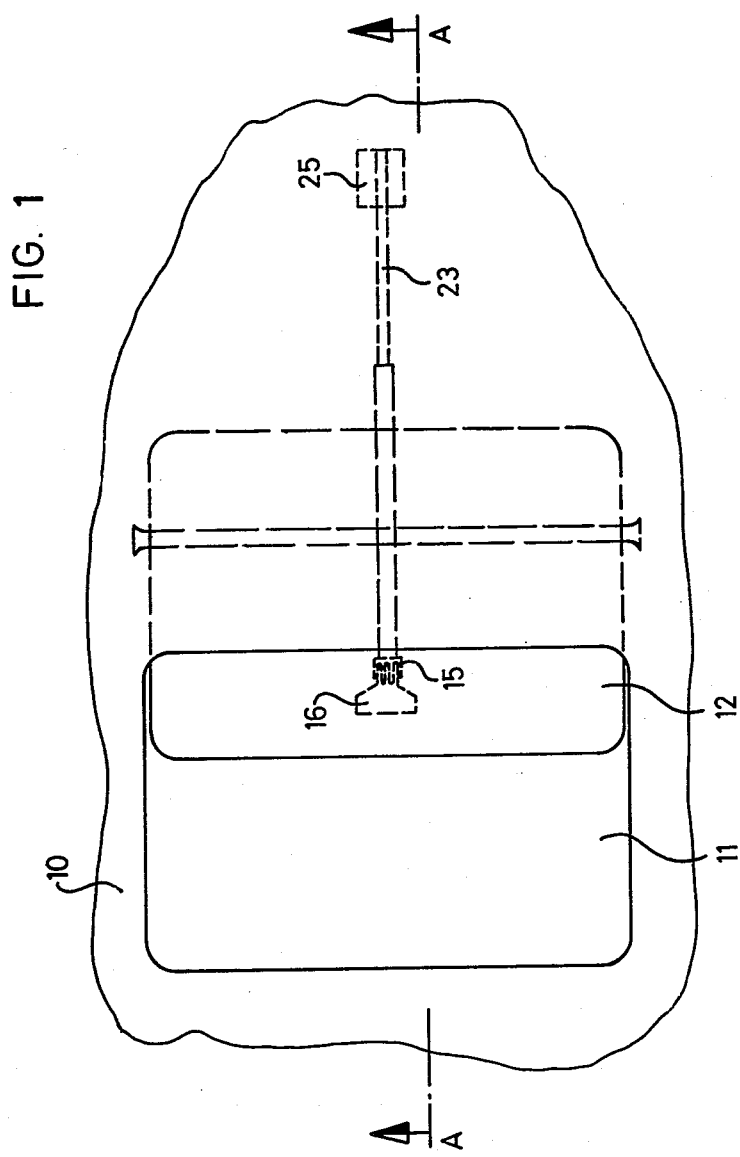
FIG. 1 is a schematic top view of the roof in a nearly fully open position.
Figure 2:
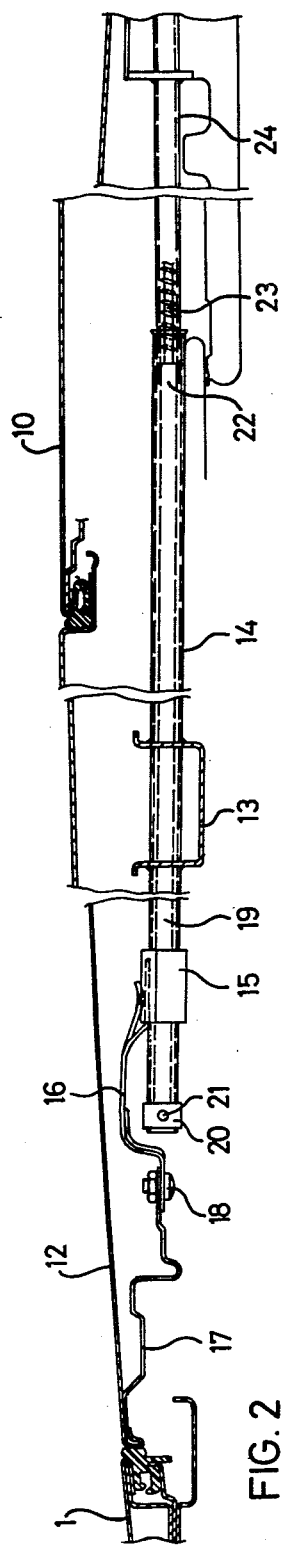
FIG. 2 is a lengthwise section through the roof along line A—A in FIG. 1, in the closed position.
Figure 3:
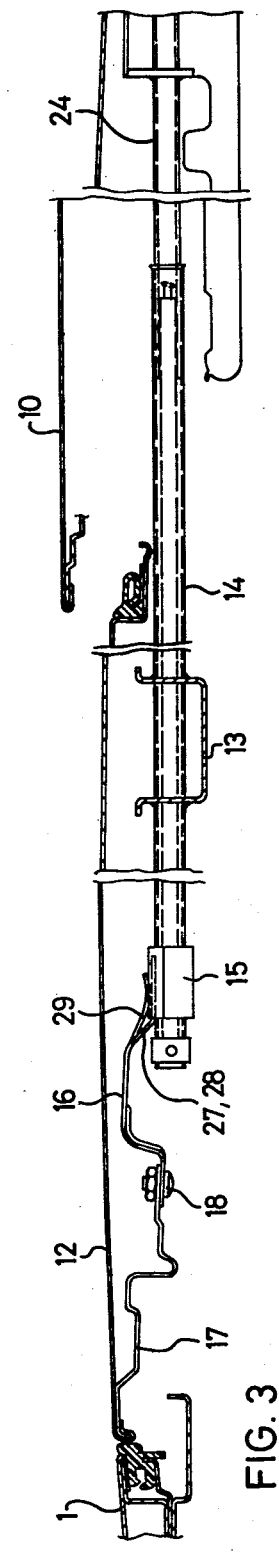
FIG. 3 is a lengthwise section through the roof along line A—A in FIG. 1, in the lowered position.
Figure 4:
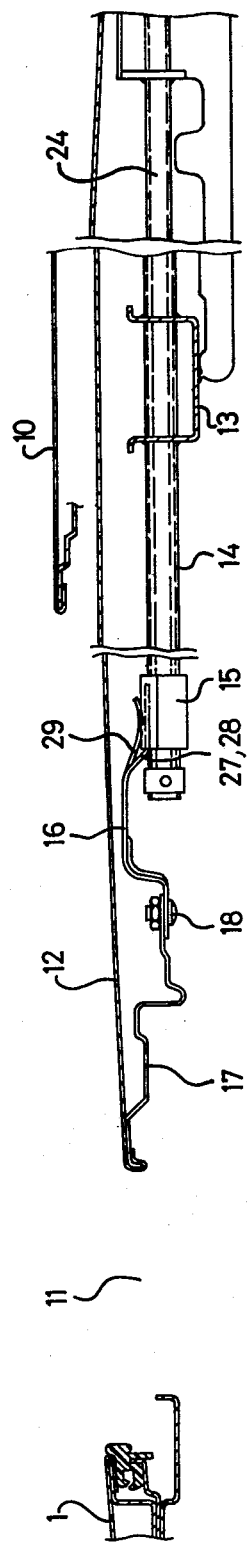
FIG. 4 is a lengthwise section through the roof along line A—A in FIG. 1, in the half-open position.

As is evident from FIGS. 1 to 4, the solid roof 10 of a motor vehicle is provided with a roof opening 11, that is selectively closed by a rigid sliding cover 12 (FIG. 2) or at least partially opened by virtue of the fact that sliding cover 12 is initially lowered in the vicinity of its trailing edge (FIG. 3) and then pushed more or less rearward beneath the fixed part of roof 10 (FIGS. 1 and 4). Sliding cover 12 is guided in a conventional fashion, in the vicinity of its leading edge, by means of guides in lateral tracks mounted in the fixed part of the roof. A transport bridge 13, with a U-shaped cross section and running at right angles to the length of the vehicle, is advantageously displaceably mounted at both ends in the same tracks. An outer telescoping tube 14 is fastened to transport bridge 13, the forward end of said tube projecting displaceably through a guide 15. Guide 15 is mounted in a bearing member 16, said member, in turn, being connected by screws 18 to a cover inner panel 17. An inner telescoping tube 19 is located inside outer telescoping tube 14, the forward end of said inner tube being connected to the forward end of outer telescoping tube 14 by a clip 20 and a cross pin 21. An incompressible drive cable 23 is fastened to the rear end 22 of inner telescoping tube 19, said cable being guided in a guide tube 24 fastened to the fixed part of the roof.

Drive cable 23 runs to a drive motor 25, indicated schematically in FIG. 1, said motor being mountable at any appropriate point, for example, in the trunk of the motor vehicle. Optionally, any known manual drive mechanism can be provided to actuate drive cable 23, said mechanism comprising, for example, a hand crank located in the vicinity of the leading edge of roof opening 11 beneath fixed roof part 10.

For example, in order to move sliding cover 12 from the half-open position in FIG. 4 to the closed position in FIG. 2, drive cable 23 is displaced forward by means of drive motor 25. Drive cable 23 drives sliding cover 12 by means of inner telescoping tube 19, outer telescoping tube 14, and transport bridge 13 until the leading edge of the sliding cover strikes the leading edge of roof opening 11 (FIG. 3). Further displacement of drive cable 23, telescoping tubes 14 and 19, and transport bridge 13 causes sliding cover 12 to be raised in the vicinity of its trailing edge and thereby move from the position shown in FIG. 3 to the position shown in FIG. 2. The lifting mechanism, not shown in greater detail, can be designed in any known fashion. For example, it can be a crank device (FIG. 3, German Pat. No. 1,228,950) or a lever mechanism (FIG. 1, German Pat. No. 2,461,018 and corresponding U.S. Pat. No. 4,056,274).

As can be seen in detail in FIGS. 5 and 6, bearing member 16 is provided with three spring tongues 27, 28 and 29, extending essentially in the direction of the lengthwise axis of telescoping tube 14. Middle spring tongue 29 is configured relative to the two outer spring tongues 27, 28, in such fashion that the free end 31 of spring tongue 29 extends beneath the free ends of spring tongues 27 and 28 in a relaxed or inactive condition (FIG. 5), so that a pretension effect occurs in use. Bearing member 16, viewed from the side (FIG. 5) is essentially U-shaped. The bearing member 16 can be made, for example, from chrome-nickel steel, and its web 32 has a cut-out 33 between a pair of reinforcing recesses 34.

Guide 15, preferably made of plastic (FIGS. 7, 8 and 9), comprises two lateral projections 35, 36 with blind holes 37, 38 directed lengthwise therein. Furthermore, openings 39, 40 terminate in blind holes 37, 38. The free ends of spring tongues 27, 28 are inserted in blind holes 37, 38 until the beads 30, formed thereon (FIG. 6), engage into openings 39, 40. This ensures a secure connection between the guide 15 and spring tongues 27, 28, which act as a support. Guide 15, as is apparent from FIGS. 7 to 9, is slotted in the area between the two projections 35 and 36 to form a spring-loaded nose 41. Lengthwise slots 42, which delimit nose 41, terminate in front of the end edges 43, 44 of the guide. Consequently, a lengthwise opening 45 is formed in guide 15 and serves to receive outer telescoping tube 14, and comprises a continuous wall part 46, 47 at respective lengthwise ends of the guide. Spring tongue 29 is applied externally against nose 41 and pushes the nose inward. Consequently, the inside of nose 41 is pressed against the circumferential wall of outer telescoping tube 14 to suppress rattling noises.

When sliding cover 12 moves from the position shown in FIG. 3 to the position indicated in FIG. 2, or vice versa, not only is outer telescoping tube 14 displaced lengthwise with respect to guide 15, but the mutual angular orientation of telescoping tube 14 and sliding cover 12 also changes simultaneously in the manner which will be apparent from a comparison of FIGS. 2 and 3. This change in angle is permitted by the fact that spring tongues 27, 28 are bent in a spring-loaded flexible way. Guide 15, in this way, describes a pivoting movement about a pivoting axis which runs transversely to the lengthwise axis.

While I have shown and described a single embodiment in accordance with the present invention, it is understood that the same is not limited thereto, but is susceptible of numerous changes and modifications as known to those skilled in the art, and I, therefore, do not wish to be limited to the details shown and described herein, but intend to cover all such changes and modifications as are encompassed by the scope of the appended claims.

I claim:

1. Bearing device for connecting a telescoping tube of a sliding roof for vehicles to the sliding roof, which is displaceable lengthwise and pivotable about a pivot axis running transversely to its lengthwise axis, comprising a guide traversed by a telescoping tube, said guide being fastened to a bearing member having a resilient support for producing a spring action which permits pivoting of the guide relative to the sliding roof.

2. Bearing device according to claim 1, wherein said guide has a bore defined by a bore wall for surroundingly receiving said telescoping tube and wherein the bearing member is provided with at least one spring-loaded pressing part for pressing a segment of the bore wall of the guide against a circumferential wall of the telescoping tube.

3. Bearing device according to claim 1, wherein at least one spring tongue is provided as said support and onto which the guide is pushed or clipped.

4. Bearing device according to claim 3, wherein said guide has a bore defined by a bore wall for surroundingly receiving said telescoping tube and wherein the bearing member is provided with at least one spring-loaded pressing part for pressing a segment of the bore wall of the guide against a circumferential wall of the telescoping tube.

5. Bearing device according to claim 4, wherein the bearing member comprises three spring tongues pretensioned relative to one another and extending essentially in the direction of the lengthwise axis of the telescoping tube receiving bore, an outer two of which comprise said support, and a middle tongue of which forms said pressing part.

6. Bearing device according to claim 5, wherein said guide comprises two lateral projections for receiving free ends of the spring tongues comprising the support.

7. Bearing device according to claim 6, wherein said bore wall segment is formed by said guide being slotted in an area located between the two lateral projections to form at least one spring-loaded nose which cooperates with said pressing part.

8. Bearing device according to claim 7, wherein the slots which delimit said nose terminate in front of end edges of the guide.

9. Bearing device according to claim 7, wherein the guide is made of plastic.

10. Bearing device according to claim 9, wherein the bearing member is made of sheet steel.

11. Bearing device according to claim 5, wherein the guide is made of plastic.

12. Bearing device according to claim 11, wherein the bearing member is made of sheet steel.

13. In a drive for a displaceable roof panel assembly of the type having a telescoping tube pivotally and lengthwise displaceably connected to a displaceable roof panel by a bearing means, the improvement wherein said bearing means comprises a guide member through which said telescoping tube is traversable, and a bearing spring member connected to said guide member for resiliently supporting said guide member in a manner producing a spring action enabling pivotal movement of the guide member relative to the roof panel.

14. In a drive for a displaceable roof panel assembly according to claim 13, wherein said guide member has a bore defined by a bore wall for surroundingly receiving said telescoping tube and wherein the bearing spring member is provided with at least one spring-loaded pressing part for pressing a segment of the bore wall of the guide member against a circumferential wall of the telescoping tube.

15. In a drive for a displaceable roof panel assembly according to claim 14, wherein the bearing spring member comprises three spring tongues, said spring tongues, in use, being pretensioned relative to one another and extending essentially in the direction of the lengthwise axis of the telescoping tube receiving bore, an outer two of which comprise a support for the guide member, and a middle tongue of which forms said pressing part.

16. In a drive for a displaceable roof panel assembly according to claim 15, wherein said guide member comprises two lateral projections for receiving free ends of the spring tongues comprising the support.

17. In a drive for a displaceable roof panel assembly according to claim 16, wherein said bore wall segment is formed by said guide member being slotted in the area located between the two lateral projections to form at least one spring-loaded nose which cooperates with said pressing part.

18. In a drive for a displaceable roof panel assembly according to claim 17, wherein the slots which delimit said nose terminate in front of end edges of the guide member.

19. In a drive for a displaceable roof panel assembly according to claim 17, wherein the guide member is made of plastic.

20. In a drive for a displaceable roof panel assembly according to claim 19, wherein the bearing spring member is made of sheet steel.

* * * * *